United States Patent [19]

Eckert

[11] Patent Number: 5,496,097
[45] Date of Patent: Mar. 5, 1996

[54] PROCESS FOR THE ADJUSTMENT OF A BRAKING VALUE TO A DESIRED BRAKING VALUE

[75] Inventor: Horst Eckert, Rehburg-Loccum, Germany

[73] Assignee: WABCO Vermogensverwaltungs GmbH, Hanover, Germany

[21] Appl. No.: 245,427

[22] Filed: May 18, 1994

[30] Foreign Application Priority Data

May 28, 1993 [DE] Germany .......................... 43 17 846.4

[51] Int. Cl.⁶ .................................................. B60T 13/66
[52] U.S. Cl. .................... 303/155; 303/DIG. 4; 303/20
[58] Field of Search .............................. 180/197; 303/15, 303/16, 20, 91, 95, 100, 103, 110, 111, 113.4, 115.2, DIG. 3, DIG. 4; 364/426.01–426.03

[56] References Cited

U.S. PATENT DOCUMENTS

| | | | |
|---|---|---|---|
| 3,888,550 | 6/1975 | Reinecke et al. | 303/20 X |
| 4,043,608 | 8/1977 | Bourg et al. | 364/426.01 X |
| 4,225,195 | 9/1980 | Weise et al. | 303/103 X |
| 4,859,002 | 8/1989 | Yoshino | 303/103 |
| 4,875,740 | 10/1989 | Takayama | 303/20 X |
| 5,082,333 | 1/1992 | Fukushima et al. | 364/426.02 X |
| 5,364,173 | 11/1994 | Wada et al. | 303/DIG. 3 X |

FOREIGN PATENT DOCUMENTS

| | | |
|---|---|---|
| 1961039 | 6/1971 | Germany . |
| 3237921 | 4/1984 | Germany . |
| 3502825 | 7/1986 | Germany . |

OTHER PUBLICATIONS

Article By: Fritsche, Gunter & Reinecke, Erich entitled "Elektronishes Bremsregelsystem fur Nutzfahrzeuge", in ATZ Automobiltechnische Zeitschrift 74, 1972, 7 S.277–282; insb. Abschn. 4.2.

*Primary Examiner*—Robert J. Oberleitner
*Assistant Examiner*—Alfred Muratori
*Attorney, Agent, or Firm*—Meltzer, Lippe et al.

[57] ABSTRACT

A process and system for attaining a desired braking value is disclosed. The actual braking value is adjusted until the desired braking value is attained. Conventionally the braking hysteresis worsens the response of a brake and, thereby, worsens the quality of the regulation of a braking system with regulated braking value. Known processes reduce the brake application energy in steps if the actual braking value is too great until the braking hysteresis has been overcome and the desired braking value has been attained. Whereas, the present invention decreases the brake application energy ZS by a value (HyS+W) consisting of the braking hysteresis HyS associated with the desired braking value and a effect drop-off W. This decrease occurs in the case of excessive actual braking value BI. The process accelerates the attainment of the desired braking value BS. The preferred area of application for the invention are braking systems in the automotive industry.

13 Claims, 2 Drawing Sheets

PROCESS FOR THE ADJUSTMENT OF A BRAKING VALUE TO A DESIRED BRAKING VALUE

FIELD OF THE INVENTION

This invention relates to a process and system for adjusting an actual braking value to a desired braking value.

BACKGROUND OF THE INVENTION

The concept "adjustment of the braking value", "disappearance of the deviation" and terms of similar meanings must always be understood in this text to be within the limits of practically unavoidable tolerances.

The areas of application for the invention are braking systems which, in conjunction with an object to be braked, form a closed loop control circuit in which the braking value is the adjusted value and the brake application energy is the actuating medium. A desired braking value is demanded from such a braking system by feeding it with a desired-braking value demand. The braking system is prompted to meet the desired braking value demand by automatically making the appropriate adjustment and variation to the brake application energy. A process of this type is known from DE 35 02 825.

The at least one brake of a braking system produces a braking force when brake application energy is supplied. The braking value produced by the braking system is a parameter which depends on the brake's brake force. The braking value depends exclusively on the brake force, when the force represents the braking value itself. However, the braking value, in addition to the brake force of the brake, is generally determined by parameters of the braked object. In automotive engineering, as disclosed in DE 35 02 825 A1, the brake force between the wheel and the road, as well as the vehicle deceleration, are generally used as the braking value. Here dimensions of the vehicle or of vehicle parts or the weight of the vehicle contribute in a known manner in determining the braking value.

Generally, the following formula applies to the dependency between the brake application energy and the braking value:

$$B = F*M*C*Z \qquad (I)$$

In this formula,

B is the braking value;

Z is the brake application energy;

C is a coefficient defining the brake characteristics inclusive of possible transmission ratios;

F is a coefficient defining the weight of the braked object; and

M is a coefficient defining brake-relevant dimensions of the braked object.

Depending on the type of braking value selected, one or several of the coefficients C, F and M may be constant or variable. If, for instance, the vehicle deceleration is taken as the braking value, then F is a variable. On the other hand, one or more of the coefficients C, F and M can be set as insignificant and equal to 1, depending on the type of braking value selected. This applies in automotive engineering, for example, to F if the brake force between the wheel and the road serves as braking value.

The schematic brake force\brake application energy diagram of FIG. 1 illustrates that the brake has characteristic curves representing the produced brake force (K) as a function of the brake application energy (Z) for brake activation and for brake release. These curves take different courses because of the brake's hysteresis. During brake actuation, i.e. when the brake application energy (Z) is increasing or remains unchanged after having risen, the brake force (K) follows characteristic curve (X) starting from a brake application energy value ZA. The brake application energy value ZA is the value required to overcome the response resistances. When the maximum value ZOU of the brake application energy (Z) has been reached, the brake produces the greatest possible brake force KM. The maximum value ZOU is determined by the energy supply of the brake system. When the brake is released, i.e., when the brake application energy (Z) drops or remains unchanged after having dropped, the brake continues to produce the brake force or pressure KM until the brake application energy (Z) has dropped to a value ZOT. Only in the case of a further drop in the brake application energy (Z) does the brake force (K) also drop. This drop in brake force (K) is represented by the characteristic curve (Y). The behavior of the brake with a lower brake application energy (Z) and corresponding brake force (K) is analogous. Starting, for instance, from an intersecting point with the coordinates, such as in brake application energy Z1 and brake force K1, the drop in the brake force only begins after a drop in the brake application energy to a value Z2. The horizontal difference in brake application energy (Z) between the characteristic curves (X, Y) associated with each brake force (K) is the applicable hysteresis. The area between the characteristic curves (X, Y) is the hysteresis field. Because of the response resistances, as the brake is released, the brake force (K) becomes equal to zero with only a residual brake application energy ZR.

This property of the brake effects the braking system because the braking value (B) also follows different characteristic curves for brake actuation and brake release as functions of the brake application energy (Z). These curves are illustrated in FIG. 2 as corresponding characteristic curves (U) and (T). In this figure, the difference in brake application energy (Z) between the characteristic curves (U and T) and the area between the characteristic curves (U, T) represent the hysteresis (Hy) and the hysteresis field, respectively, of the braking system. FIG. 2 is analogous to FIG. 1, in that the brake application energy values, ZA, ZR, ZOU and ZOT, determine the starting and end points of the characteristic curves (U, T). If the braking system is, for example, actuated up to a point with the coordinates, such as at the desired braking value BS and the associated brake application energy ZS and if the brake application energy (Z) is decreased, then the difference in brake application energy ZS between the characteristic lines (U, T) assigned to the desired braking value BS, i.e., the hysteresis HyS, must be overcome before the braking system responds and decreases the braking value (B).

The above-indicated formula (I) only applies in the case of brake actuation because of the hysteresis. Brake actuation occurs when the brake application energy (Z) is rising or when the brake application energy (Z) remains unchanged after having risen.

Based on the braking value (B) reached in actuating the brake, according to formula (I), the following general formula applies to the hysteresis (Hy):

$$HY = ZA - ZR + (ZOU - ZOT - ZA + ZR)*((B/F*M*C) - ZA)/(ZOU - ZA) \quad (II)$$

The presence of a hysteresis is disadvantageous. This also applies when a deviation of the existing actual braking value from the demanded desired braking value occurs during a brake actuation. In other words, when the actual braking value becomes too great.

In order to eliminate this deviation, the conventional process provides two alternatives. In the first alternative, the known process decreases the brake application energy in steps until the hysteresis has been overcome and the deviation has disappeared. In the second alternative, the known process decreases the brake application energy with a comparatively wide leap which leads to falling short of the desired braking value. Then the brake application energy is increased in steps until the desired braking value has again been reached. These alternatives result in a discontinuous course of the braking value which is sensed by the operator as an unsatisfactory degree of control of the braking system.

SUMMARY OF THE INVENTION

It is an object of the instant invention to improve the conventional processes as discussed above, so that the course of the braking value is smoothed out.

In the second alternative discussed above, in order to eliminate the mentioned deviations, the known process may cause increased energy consumption. It is, therefore, an object of the present invention to provide a process which eliminates the problem of increased energy consumption.

The present invention accomplishes this objective and others by providing a process for adjusting an actual braking value (B) to a desired braking value BS in a braking system having at least one brake (12, 13). In such a process, the braking value (B) evolves as a function of the brake application energy (Z) for brake actuation and for brake release. The difference between the brake actuation function and the brake release function is the hysteresis (Hy) of the braking system for a given braking value (B).

One embodiment of this process comprises the following steps: Brake application energy (Z) is fed to at least one brake. The braking value (B) is produced by the braking system as the brake application energy (Z) is fed to the brake (12, 13). The existing brake application energy ZS is decreased by a value (HyS+W) which comprises the hysteresis HyS associated with the desired braking value BS and an effect drop-off W, when the actual braking value BI deviates from the desired braking value BS in the direction of higher braking values (B) after a rise in the brake application energy (Z).

Further embodiments of the inventive process may comprise the steps of: A deviation (BI–BS) between said actual braking value (BI) and said desired braking value is recognized only when said deviation reaches at least predetermined limit value L. If a residual deviation (BIE1–BS) is present after decreasing the brake application energy, the brake application energy (Z) is further reduced in steps until the desired braking value BS is reached. A new hysteresis HyG is used in a subsequent braking process in which a deviation (BI–BS) of the original type occurs, if a residual deviation (BIE1–BS) is still present during a brake actuation in a braking process after the reduction of the existing brake application energy ZS. If a residual deviation (BIE1–BS) is still present in the subsequent braking process after the reduction of the existing brake application energy ZS by using the new hysteresis HyG, a utilization of correction value G is repeated in at least one further braking process in which a deviation (BI–BS) of the original type occurs until reduction through the using of the new hysteresis HyG results in the desired braking value BS. If a new deviation (BS–BIE2) of the actual braking value BIE2 from the desired braking value BS in direction of lower braking values (B) is present during brake actuation in a braking process after reduction of the existing brake application energy ZS, by a correction value V, a new hysteresis HyV is used in a subsequent braking process in which a deviation (BI–BS) of the original type occurs, wherein the new hysteresis HyV comprises a reduction of the hysteresis HyS associated with the desired braking value BS. If in the subsequent braking process the actual braking value BIE2 deviates from the desired braking value BS in the direction of lower braking values (B) after the reduction of the existing brake application energy ZS with the utilization of the new hysteresis HyV, the utilization of the correction value V is repeated in at least one further braking process in which a deviation (BI–BS) of the original type occurs until the desired braking value (BS) is obtained through utilization of the new hysteresis HyV.

These objectives are further accomplished by the present invention by providing a braking system for adjusting an actual braking value (B) to a desired braking value (BS).

One embodiment of the braking system comprises at least one brake (12, 13), a braking value indicator (2) for emitting an electrical desired-braking value signal, a braking value sensor (1) for emitting an electrical actual braking value signal, an electrically controlled energy distributor (11) having a control system (14) and an output connected to said brake, and regulating electronics (4) having a first input connected to the braking value indicator (2) and a second input connected to the braking value sensor (1) and an output connected to the control system (14) of the energy distributor (11). The regulating electronics compare the actual braking value signal to the desired braking value signal to determine a brake application energy signal and transmit the brake application energy signal to the control system (14) of the energy distributor (11). The hysteresis (Hy) is stored as a function of the braking value (B). The regulating electronics reduce the brake application energy signal by a value resulting from reduction of existing brake application energy ZS by the value (HyS+W) when a deviation of the actual braking value BI from the desired braking value BS in direction of higher braking values (B) is detected following a rise in the brake application energy signal. The value (HyS+W) consists of the hysteresis HyS associated with the desired braking value BS and an effect drop-off W.

In another embodiment of the invention, the regulating electronics reduce the brake application energy signal in the subsequent braking process, in which a deviation (BI–BS) occurs, by a value corresponding to the application of a hysteresis HyG increased by a correction value G, if a residual deviation (BIE1–BS) still exists during a brake actuation in a braking process after the reduction of the brake application energy signal, and repeat the reduction in subsequent braking processes which follow a braking process in which a residual deviation has appeared until the desired braking value BS is attained.

In still another embodiment of the invention, the regulating electronics reduce the brake application energy signal by a value corresponding to the application of a hysteresis HyV reduced by a correction value V in the subsequent braking process in which a deviation (BI–BS) of the original type occurs when a deviation (BS– BIE2) of the actual braking value BIE2 from the desired braking value BS in direction of lower braking value (B) is present during a brake actuation in a braking process after the reduction of the brake application energy signal, and repeat the reduction in subsequent braking processes following a braking process in which such a deviation (BE–BIE2) has occurred until the desired braking value BS is obtained.

The present invention is not only suitable for any type of brake application energy, but also for all technical fields in which the above-mentioned problems, as well as others, occur. An important area for application of the invention is the field of braking systems in the automotive industry. In such systems, the pressure of a hydraulic and/or pneumatic pressure fluid is used as the brake application energy and compressed air is generally used as the pneumatic pressure fluid.

Additional advantages of the invention are mentioned in the explanation which follows through drawings.

DETAILED DESCRIPTION OF THE INVENTION

Figure 3:
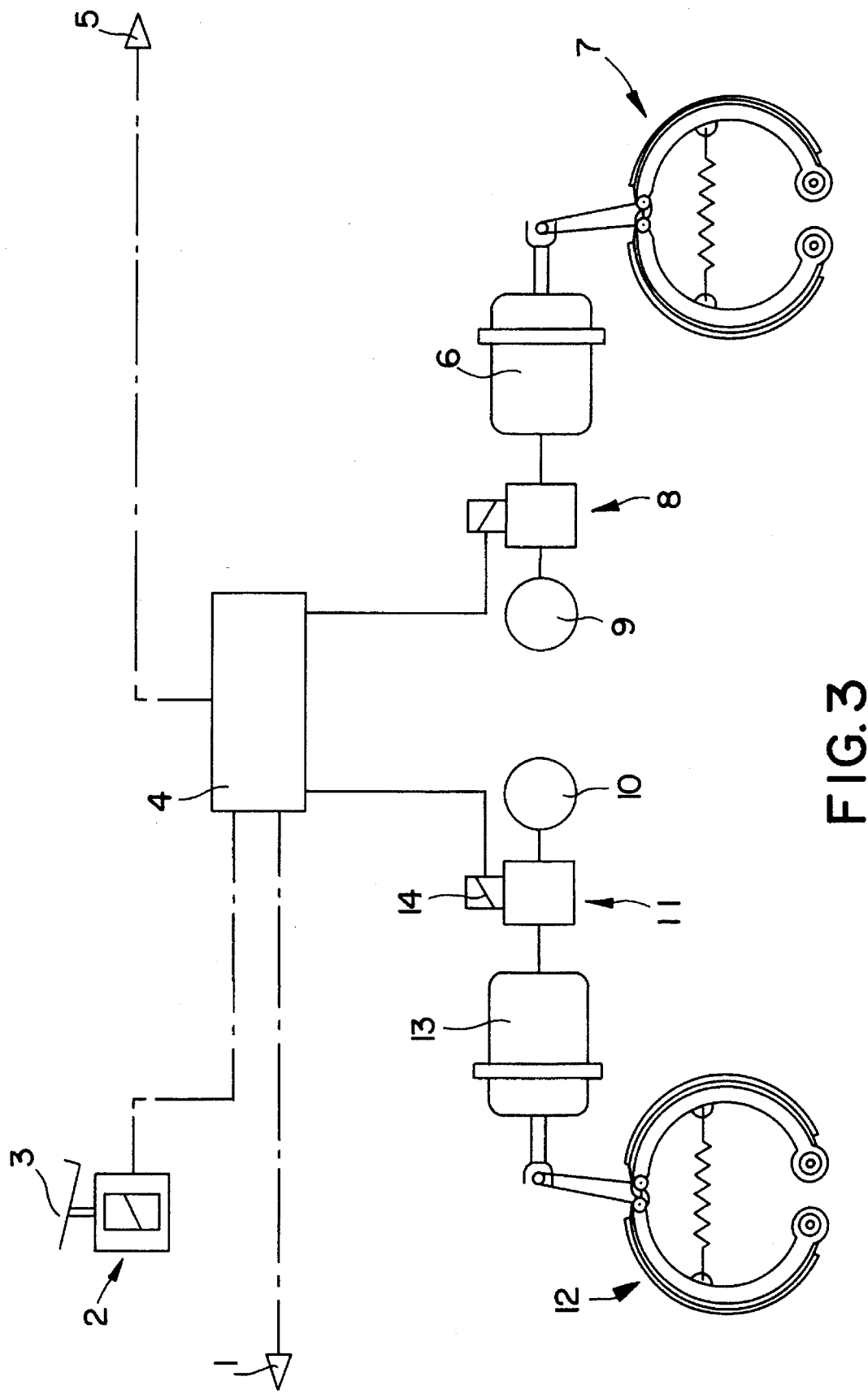
FIG. 3 schematically illustrates a braking system wherein solid lines represent energy lines and dot-dash lines represent signal lines.

The electrically controlled braking system ("EBS") shown in FIG. 3 is provided in its basic design with a brake (12, 13) actuated by the supply of brake application energy (Z) from an energy supply (10). The brake (12,13) normally consists of a braking apparatus (12), which produces the brake force, and a brake application device (13), which receives the brake application energy (Z) and transforms it into a brake application force for the braking apparatus (12). The appertaining transmission elements for the energy are not designated in detail.

For adjustment of the brake application energy (Z) supplied to the brake (12, 13), or more precisely to the brake application device (13), an electrically controlled energy distributor (11) is associated with the brake (12, 13). The energy distributor (11) is connected to the energy supply (10), to the brake application device (13) and also to an energy relieving device, which is not shown. If a hydraulic or non-air pressure fluid is used, the energy relieving device is a collecting container which is normally subjected to atmospheric pressure. When compressed air is used, the energy-pressure relieving device is, as a rule, the atmosphere.

Two types of designs are generally used for the energy distributor (11). In one design, which is digital, the electric control system (14) of the energy distributor (11) requires a fixed brake application energy build-up signal, a brake application energy maintenance signal and an energy drop signal, which signals have fixed values. As the control system (14) receives the brake application energy build-up signal, the energy distributor (11) connects the energy supply (10) to the brake application device (13). As the control system (14)receives the brake application energy maintenance signal, the energy distributor (11) disconnects the brake application device (13) from the energy-pressure relieving device and from the energy supply (10). When the brake application energy reduction signal is received, the energy distributor (11) disconnects the brake application device (13) from the energy supply (10) and connects it to the energy relieving device. In the second type of design, the electrical control system (14) of the energy distributor (11) requires a variable brake application energy signal. When the variable brake application energy signal is received, the energy distributor (11) connects the brake application device (13) either to the energy supply (10) or to the energy relieving device until the brake application energy (Z), which corresponds to the brake application energy signal, has been built up in the brake application device (13). Although the coordination between the brake application energy (Z) and the brake application energy signal need not necessarily be linear, this type of design is generally designated as a "proportional design". When the pressure of a pressure fluid, e.g. compressed air, is used as the brake application energy, the energy distributors used in either of the two designs are generally solenoid valves.

The braking system is furthermore provided with an electrical braking value indicator (2), regulating electronics (4) and a braking value sensor (1). If one or several of the parameters, which are included in the braking value (B) according to the formula (I), are variable, then one or more additional sensors, which ascertain said parameters directly or indirectly, are included in the braking system. Such additional sensors are represented by 5 in FIG. 3.

The braking value indicator (2) is capable of receiving a desired braking value demand issued by the operator in the form of a regulating element force and/or a regulating element travel by means of a regulating element (3) and of emitting a desired braking value signal corresponding to the braking value demand. The regulating element (3) is shown in the drawing as a pedal or hand lever. The braking value sensor (1) measures the existing actual braking value BI and issues a corresponding actual braking value signal. Additional sensors, such as sensor (5), act in a comparable manner with respect to the parameter ascertained by each sensor.

The braking value indicator (2), the braking value sensor (1) and, if applicable, the sensor (5), are connected to inputs of the regulating electronics (4). The control system (14) of the energy distributor (11) is connected in the digital type of design to at least two outputs of the regulating electronics (4) and in the proportional type of design to one output of the regulating electronics (4).

All the electronic components needed to carry out the functions described below, including the appertaining memories, are contained in the regulating electronics (4) and are programmed appropriately.

The regulating electronics (4) can be grouped together structurally. They can also be grouped, in the customary manner, with other electronic component groups, such as anti-blocking protection electronics.

The functioning of the braking system shall now be explained with reference to FIGS. 1 and 2 and on the basis of an energy distributor (11) in the proportional type of design.

The operator actuates the braking system by acting upon the braking value indicator (2) by means of the regulating element (3), thereby, producing the desired braking value signal. The regulating electronics (4) are switched on upon receiving the produced desired braking value signal in this manner and are switched off when the desired braking value signal is terminated. During the time of their being switched on, the regulating electronics (4) query the desired braking value signal with their cycle frequency and compare the detected desired braking value signal to the one detected during the previous cycle. Thus, the regulating electronics (4) are always informed as to whether the desired braking value signal rises, remains unchanged or drops. As described below, the brake application energy follows the desired braking value signal. Therefore, the information obtained by the course of the desired braking value signal provides the information as to whether brake actuation or brake release is taking place at that moment. Alternatively, the regulating electronics (4) can be designed so that they compare the brake application energy signal described below from cycle to cycle and obtain information on brake actuation or brake release from the course of this signal.

From the desired braking value signal, and possibly also from the signal of the sensor (5), the regulating electronics (4) calculate a brake application energy signal on the basis of the formula (I). The brake application energy signal corresponds to the brake application energy ZS for the desired braking value BS. The regulating electronics (4) transmit the brake application energy signal to the energy distributor (11). The energy distributor (11) then connects the brake application device (13) to the energy supply (10) until the brake application energy ZS corresponding to the desired braking value BS has built up in the brake application device (13). When the desired braking value signal drops and the brake application energy signal decreases accordingly, the energy distributor (11) connects the brake application device (13) to the energy relieving device until the corresponding drop of brake application energy has occurred in the brake application device (13).

The regulating electronics (4) also query the braking value sensor (1) at each cycle and compare its actual braking value signal to the desired braking value signal. The regulating electronics can ascertain during a brake actuation, i.e., after the rise of the desired braking value signal or during unchanged desired braking value signal following its rise, whether the actual braking value signal deviates from the desired braking value signal. If such a deviation (BI–BS), of the actual braking value BI from the desired braking value BS in the direction of higher braking values (B), is detected, then the actual braking value BI is too high. The regulating electronics (4) then calculate the hysteresis HyS which is associated with the desired braking value BS based on formula (II) and decreases the brake application energy signal by a value which corresponds to a decrease in the existing brake application energy ZS by a value (HyS+W), which results from the above-mentioned hysteresis HyS and a value to be designated as an effect drop-off W.

Depending on the special design of the regulating electronics (4), the effect drop-off W may have a fixed value or may depend on the magnitude of the existing deviation (BI–BS) of the actual braking value BI from the desired braking value BS. Furthermore, it may depend on the fluthysteresis HyS associated with the desired braking value BS. If the effect drop-off W has fixed value, the regulating electronics (4) can read it from a memory.

If the effect drop-off W depends on the magnitude of the deviation (BI–BS) and the above-mentioned hysteresis HyS, the regulating electronics (4) calculate W based on the following formula:

$$W=((BS/F*M*C)-ZA)*(BI-BS)*((BS/F*M*C)-HyS-ZR/BS*((BS/F*M*C)-ZA) \qquad (III)$$

Figure 1:
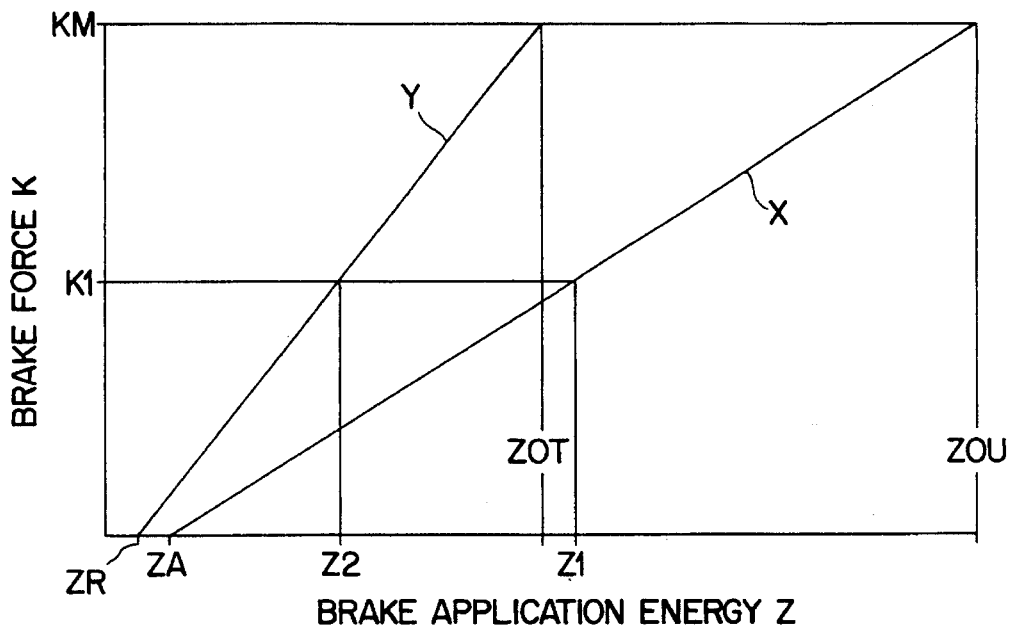
FIG. 1 is a schematic diagram of the energy and braking value of a brake.

This reduction of the brake application energy signal results in a drop of the brake force produced by the brake (12, 13) to a value assigned to the characteristic line (Y) for brake release in FIG. 1 according to the effect drop-off W and thereby results, as a rule, in the disappearance of the deviation (BI–BS).

In an alternative embodiment, the regulating electronics (4) can calculate the hysteresis HyS directly after calculating the brake application energy signal and can buffer-store the calculated hysteresis until the possible occurrence of an excessive actual braking value BI.

The now described reduction of the brake application energy (Z) may not result in a disappearance of the deviation (BI–BS) but only in a decrease of the original deviation (BI–BS) to a residual deviation (BIE1–BS). For this case, the regulating electronics (4) may be designed so that while they are switched on, i.e., during the current braking process, they continue to reduce the brake application energy signal as required in one step or in several steps until the disappearance of even the residual deviation (BIE1– BS). Here the individual step may have a fixed stored value which must be less than the effect drop-off W. However, the regulating electronics (4) may also be designed so that they calculate the magnitude of the step according to the formula:

$$\text{Step}=(BIE1-BS)*((BS/F*M*C)-HyS-ZR)/BS \qquad (IV)$$

A braking system which reacts, as described above, each time the actual braking value becomes too great may be sensed in practice, by the operator as functioning unevenly and, therefore, uncomfortably. For such cases, the braking system may be further designed so that the regulating electronics (4) only recognize the presence of a deviation (BI–BS) if it reaches a predetermined threshold value L. This threshold value L may have a constant magnitude over the entire possible brake application energy range. The magnitude is stored in the regulating electronics (4). However, the magnitude of the threshold value L may also depend on the magnitude of the desired braking value BS. In such a case, the regulating electronics (4) calculate the threshold value L simultaneously with the brake application energy signal. A curve of the threshold value L which is dependent on the magnitude of the desired braking value BS, is shown in FIG. 2 as a broken line (R). The difference, which is parallel to the ordinate, between the characteristic line (U) for brake actuation and line (R) indicates the appertaining threshold value L for each braking value (B). In this further embodiment, the regulating electronics (4) additionally calculate the magnitude of the threshold value L for each braking value (B) according to the following formula:

$$L=LF*B+LO \qquad (V)$$

In the formula (V), LF is a threshold value factor and LO a beginning threshold value. The threshold value factor LF may be between 0.002 and 0.1. The beginning threshold value LO ensures that a defined threshold value also exists within the range of lower, braking values and that a "fluttering" operation of the braking system is avoided within this range.

The beginning threshold value LO may be, for example:

$$LO=(0.02\ldots 0.1)*BM \qquad (VI)$$

To make this more comprehensible, the line (R) is drawn so that the applicable threshold value L appears out-of-scale and large.

In this further development, the regulating electronics (4) carry out the reduction of the brake application energy signal by the value corresponding to the above-mentioned decrease (HyS+W) of the existing brake application energy ZS only when the deviation (BI–BS) in question reaches the magnitude of the current threshold value L.

In this further development, the regulating electronics (4) may also be designed so that the threshold value L is not applied within the range of high braking values (B) because within this full-braking range the greatest possible braking action is wanted, while even and comfortable performance of the braking system is of secondary importance.

Of the parameters contained in the formula (II), ZA, ZR and ZOT are determined in tests conducted with one or several actual brakes. The actual hysteresis which occurs in operation may deviate for various reasons from the hysteresis calculated according to the formula (II). The calculated hysteresis shall be called "theoretic" hereinafter. Such deviations may be caused by changes due to operation, maintenance or age of the braking system, in particular of the brake. The deviations may also be caused by unavoidable quality scattering occurring in the assembly-line production of the components of the braking system, in particular of the brake (12, 13). Of all the influences due to operation of the system, the thermic condition of the brake (12, 13) is to be particularly noted.

Figure 2:
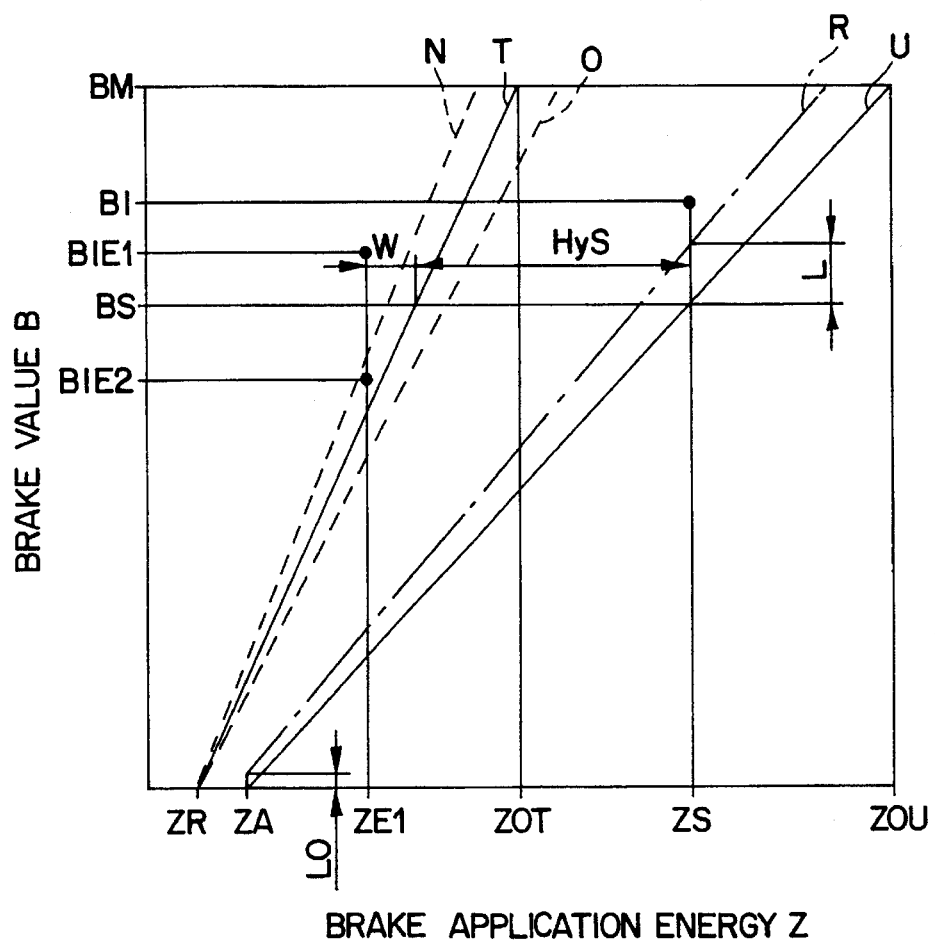
FIG. 2 is a schematic diagram of the energy and force of a braking system.

Two broken curves (N and O) are drawn in FIG. 2. The curve (N) represents a case in which the actual hysteresis is greater than the theoretic hysteresis. In this example, the characteristic curve (T) for the release of the brake has changed to curve (N). The curve (O) represents a case in which the actual hysteresis is less than the theoretic hysteresis. In this example the characteristic curve (T) for brake release has changed to the curve (O).

In cases where the real hysteresis is greater than the theoretic hysteresis, such as (N), the reduction of the brake application energy ZS associated with the desired braking value BS by a value (HyS+W) results in the residual deviation (BIE1–BS), as discussed earlier. When the actual hysteresis is very much greater than the theoretic hysteresis, the new braking value BIE1 may be equal to the original actual braking value BI and the residual deviation (BIE1–BS) may be equal to the original deviation (BI–BS).

In the case of an actual hysteresis which is smaller than the theoretic hysteresis, such as (0), the actual braking value BIE2 occurring after a reduction of the existing brake application energy value ZS by a value (HyS+W) drops below the desired braking value BS. Thus, the actual braking value BIE2 deviates from the desired braking value in the direction of lower braking values (B), so that a new deviation (BS–BIE2) exists after a reduction of the brake application energy ZS by the value (HyS+ W).

The regulating electronics (4) may be further developed in such a manner that they adapt the braking system to the applicable actual hysteresis.

For this purpose, the regulating electronics (4) may be designed for the case of greater actual than theoretical hysteresis in such a manner that during their period of operation, i.e., during the current braking process, the regulating electronics will further reduce the brake application energy signal in one or more steps until the deviation (BI–BS) disappears. Hence, in this case, the regulating electronics (4) operate as in the previously described case where the deviation (BIE1–BS) is a residual deviation. However, if the actual hysteresis is much greater than the theoretic hysteresis, the individual steps may be of a magnitude equal to, or greater than the effect drop-off W. For the case where the actual hysteresis is less than the theoretic hysteresis, the regulating electronics (4) may be designed so that they increase the brake application energy again in one or more steps until the deviation (BS–BIE2) disappears while they are switched on, i.e., during the current braking process. For this situation, the individual steps may be of a magnitude equal to or greater than the effect drop-off W. In order to accelerate the adaptation, the regulating electronics (4) may size the first step in accordance with the hysteresis assigned to the new actual braking value BIE2.

The regulating electronics (4) may also be developed further so as to adapt the braking system in anticipation of the applicable actual hysteresis for subsequent braking processes on the basis of experience gathered during previous braking processes.

If the regulating electronics (4), in this further development, ascertain during a braking process, that after a reduction of the originally present brake application energy ZS, a residual deviation (BIE1–BS) is present (actual hysteresis is greater than theoretic hysteresis), the hysteresis HyS calculated on the basis of formula (II) will be enlarged by a correction value G. The obtained new hysteresis HyG is stored. If a deviation (BI–BS) of the original type then occurs in a subsequent braking process following a rise of brake application energy (Z), then the regulating electronics (4) calculate the value by which the existing brake application energy ZS must be decreased on the basis of the stored new hysteresis HyG. This value is (HyG+W). The brake application energy signal is then sized accordingly. The regulating electronics (4) can also be further developed so that, if a residual deviation (BIE1–BS) still exists in the braking process after the reduction of the brake application energy ZS by the value (HyG+W), the regulating electronics (4) will repeat the calculation, the storage and the application of the correction value G as above in this braking process for or during, respectively, one subsequent braking process and, if necessary, for or during, respectively, subsequent braking processes, in which a residual deviation (BIE1–BS) occurs. This repetition will occur until the deviation disappears and the applicable desired braking value BS is reached.

If, after a reduction of the originally present brake application energy ZS by the value (HyS+W), the regulating electronics (4), as further for anticipatory adaptation of the braking system to the applicable actual hysteresis, ascertain in a braking process that the actual braking value BIE2 drops below the desired braking value BS (actual hysteresis smaller than theoretic hysteresis), then the regulating electronics (4) will decrease the hysteresis HyS calculated on the basis of formula (II) by a correction value V and store the new hysteresis HyV thus obtained. When the actual braking value BIE2 drops below the desired braking value BS when a new deviation (BS–BIE2) exists. If a deviation (BI–BS) of the original type occurs in a subsequent braking process after a rise of the brake application energy (Z), then the regulating electronics (4) will calculate the value by which the existing brake application energy ZS must be decreased on the basis of the stored new hysteresis HyV. The calculated value is equal to (HyV+W). The brake application energy signal is sized accordingly. The regulating electronics (4) can also be developed further so that they repeat the calculation, the storage and the application of the correction value V according to the above for and during, respectively, one subsequent braking process and, if necessary, for and during, respectively, subsequent braking processes, in which a deviation (BS–BIE2) of the new type occurs, until the deviation disappears. Therefore, the repetition continues until the applicable desired braking value BS is obtained. This repetition takes place if a deviation (BS–BIE2) occurs again after the reduction of the brake application energy ZS by the value (HyV+W).

The correction values G and V may be addition values or multipliers. Their magnitude depends on the deviations of the practically occurring actual hysteresis from the theoretic hysteresis. If the correction value V is a multiplier, it is advantageously formed from the ratio between the actual braking value BIE2 and the desired braking value BS, as follows:

$$V = BIE2/BS \tag{VII}$$

wherein the actual braking value BIE2 is obtained by reducing the existing brake application energy ZS by the value (HyS+W).

Correspondingly, if the correction value G is a multiplier, it is advantageously formed from the ratio of the actual braking value BIE1 and the desired braking value BS, as follows:

$$G = BIE1/BS \tag{VIII}$$

wherein the actual braking value BIE1 is obtained by reducing the existing brake application energy ZS by the value (HyS+W). In practice, the magnitude of these correction values will be such that they will result in an increase or a decrease of up to 60% of the hysteresis HyS.

In actual braking systems, the braking value (B) normally follows a change in the brake application energy signal with a time delay. The time delay is due to unavoidable response delays and the time required for a change in the brake application energy. It is, therefore, advisable to design the regulating electronics (4) so that they carry out the described, step-by-step adaptation of the brake application energy signal, in the current braking process and the formation of the new hysteresis (HyG) or (HyV), respectively, only when the reaction of the braking system to the change of the brake application energy (Z) is completed. Such a change is completed, when the regulating electronics (4) no longer detect any change in the braking value (B) after a change in the brake application energy signal from one cycle to the next cycle.

The above-described further developments of the regulating electronics (4) for the adaptation of the braking system to the applicable actual hysteresis can be realized as well in the basic design of the braking system as only when the threshold value L has been reached. It will be recalled that in the basic design the braking system reacts to every deviation (BI–BS) of the actual braking value (BI) from the desired braking value (BS).

In the case of the energy distributor (11) of the digital design, the regulating electronics (4) form the brake application energy signal internally, compare it with the signal of a sensor which ascertains the brake application energy and, depending on the result of the comparison, transmit either the brake application energy build-up signal, the brake application energy maintenance signal or the energy drop signal instead of the above-mentioned variable brake application energy signal to the control system (14) of the energy distributor (11).

In many technical areas, brake systems having several brakes and their associated components are normally used. Therefore, the brake (12, 13) in FIG. 3 may represent several brakes. It is also customary to assign energy supplies and energy distributors to each brake, for example, the additionally shown brake (6,7) has an energy supply (9) and an energy distributor (8). The brake (6,7) can represent several brakes. It is customary to designate the brakes supplied from one and the same energy supply and their energy distributors with the collective term braking circuit. In automotive engineering it is, for example, customary to assign a braking circuit either to each vehicle axle or to distribute the braking circuit over several vehicle axles, in which case the term diagonal distribution is used.

In one of the cases where the braking system has several energy distributors, the regulating electronics (4) may be divided into channels in which they process the formulas (I) to (VIII) in different manners and carry out the reduction of the brake application energy signal in adaptation to actual hysteresis in different manners. This makes it possible, for example, to coordinate the calculation of the brake application energy signal assigned to each energy distributor with the particular characteristics of the brake or brakes assigned to that energy distributor. This design is, for example, useful when different brakes, e.g. with different brake application devices or different braking apparatuses, are used. In this case, the number of channels of the regulating electronics (4) is advantageously adapted to the number of existing energy distributors.

The last-mentioned further development of the regulating electronics (4) having channel divisions, also makes it possible to weigh the variable parameters which may enter into the calculation of the brake application energy (ZS) differently, e.g. the variable ascertained by the sensor (5). In this manner, it is possible to vary the braking force distribution among the brakes and, thereby, vary the share in braking value production for each brake. This possibility is of importance in automotive engineering for example in order to obtain the same adhesion utilization between the wheel and the road on all of the wheels. Where the braking circuit are assigned to the axles for example, it is possible to consider the coefficient (F), which designates the weight, as being fixed in the channels assigned to one braking circuit as explained above, and as being variable in the channels assigned to one or several other braking circuits depending on the signals of the sensor (5).

In conclusion it should be pointed out that the scope of protection of the present invention is not exhausted with the embodiment of the example together with its mentioned designs and further developments, but comprises all embodiments having characteristics which come under the following claims.

I claim:

1. A process for adjusting a braking value B to a desired braking value BS in a braking system having at least one brake (12, 13), wherein said braking value B evolves as functions of brake application energy Z for brake actuation and for brake release, and a difference between said brake actuation function V and said brake release function T is a hysteresis Hy of the braking system for a given braking value B, comprising feeding brake application energy Z to said at least one brake, producing an actual braking value BI by said braking system as said brake application energy Z is fed to said brake (12, 13), and decreasing existing brake application energy ZS by a value HyS+W, which comprises hysteresis HyS associated with said desired braking value BS and an effect drop-off W, when the actual braking value BI deviates from the desired braking value BS in the direction of higher braking values B after a rise in said brake application energy Z.

2. The process according to claim 1, further comprising recognizing a deviation BI–BS between said actual braking value BI and said desired braking value BS only when said deviation reaches at least a predetermined limit value L.

3. The process according to claim 1, wherein said effect drop-off W depends at least on the magnitude of said deviation BI–BS.

4. The process according to claim 1, further comprising,
if a residual deviation BIE1–BS is present after decreasing said brake application energy, further reducing said brake application energy Z in steps until said desired braking value BS is reached.

5. The process according to claim 1, further comprising,
using a new hysteresis HyG in a subsequent braking process in which a deviation BI–BS occurs, if a residual deviation BIE1–BS is still present during brake actuation in the braking process after the reduction of the existing brake application energy ZS.

6. The process of claim 5, wherein said new hysteresis HyG comprises an increase by a correction value G of the hysteresis HyS associated with the desired braking value BS.

7. The process according to claim 6, further comprising
if a residual deviation BIE1–BS is still present in a subsequent braking process after the reduction of the existing brake application energy ZS by using the new hysteresis HyG, repeating utilization of correction value G in at least one further braking process in which a deviation BI–BS occurs until reduction through said using of said new hysteresis HyG results in the desired braking value BS.

8. The process according to claim 1, further comprising
if a new deviation BS–BIE2 of another actual braking value BIE2 from the desired braking value BS in direction of lower braking values B is present during brake actuation in a braking process after reduction of the existing brake application energy ZS, using a new hysteresis HyV in a subsequent braking process in which a deviation BI–BS occurs, wherein said new hysteresis HyV comprises a reduction of the hysteresis HyS associated with said desired braking value BS by a correction value V.

9. The process according to claim 8, wherein said actual braking value BIE2 is obtained by reducing the existing brake application energy ZS by the value HyS+W.

10. The process according to claim 8, further comprising
if during said subsequent braking process the actual braking value BIE2 deviates from the desired braking value BS in the direction of lower braking values B after the reduction of the existing brake application energy ZS with the utilization of the new hysteresis HyV, repeating said utilization of the correction value V in at least one further braking process in which a deviation BI–BS occurs until the desired braking value BS is obtained through utilization of the new hysteresis HyV.

11. A braking system for adjusting an actual braking value B to a desired braking value BS, comprising
at least one brake (12, 13),
a braking value indicator (2) for emitting an electrical desired-braking value signal,
a braking value sensor (1) for emitting an electrical actual braking value signal,
an electrically controlled energy distributor (11) having a control system (14) and an output connected to said brake (12, 13), and
regulating electronics (4) having a first input connected to said braking value indicator (2) and a second input connected to said braking value sensor (1) and an output connected to said control system (14) of the energy distributor (11), wherein said regulating electronics
compare the actual braking value signal to the desired braking value signal to determine a brake application energy signal,
transmit said brake application energy signal to the control system (14) of the energy distributor (11),
store a hysteresis Hy as a function of the braking value B, and
reduce said brake application energy signal by a value resulting in reduction of existing brake application energy ZS by a value HyS+W, which value comprises hysteresis HyS associated with the desired braking value BS and an effect drop-off W, when a deviation of the actual braking value BI from the desired braking value BS in direction of higher braking values B is detected following a rise in the brake application energy signal.

12. The braking system as in claim 11, wherein said regulating electronics (4) further
reduces the brake application energy signal in a subsequent braking process, in which a deviation BI–BS occurs, by a value corresponding to the application of a hysteresis HyG increased by a correction value G, if a residual deviation BIE1– BS still exists during a brake actuation in a braking process after the reduction of the brake application energy signal, and
repeats the reduction in subsequent braking processes which follow a braking process in which a residual deviation has appeared until the desired braking value BS is attained.

13. The braking system as in claim 11, wherein said regulating electronics (4) further
reduces the brake application energy signal by a value corresponding to the application of a hysteresis HyV reduced by a correction value V in subsequent braking process in which a deviation BI–BS occurs when a deviation BS– BIE2 of the actual braking value BIE2 from the desired braking value BS in direction of lower braking value B is present during a brake actuation in a braking process after the reduction of the brake application energy signal, and
repeats said reduction in subsequent braking processes following a braking process in which such a deviation BE–BIE2 has occurred until the desired braking value BS is obtained.

* * * * *